Jan. 23, 1940.  R. J. SCHMIDT  2,187,794
COMPENSATING ATTACHMENT FOR MILLING MACHINES
Filed Feb. 7, 1939  2 Sheets-Sheet 1

INVENTOR.
Rudolph J. Schmidt
ATTORNEYS.

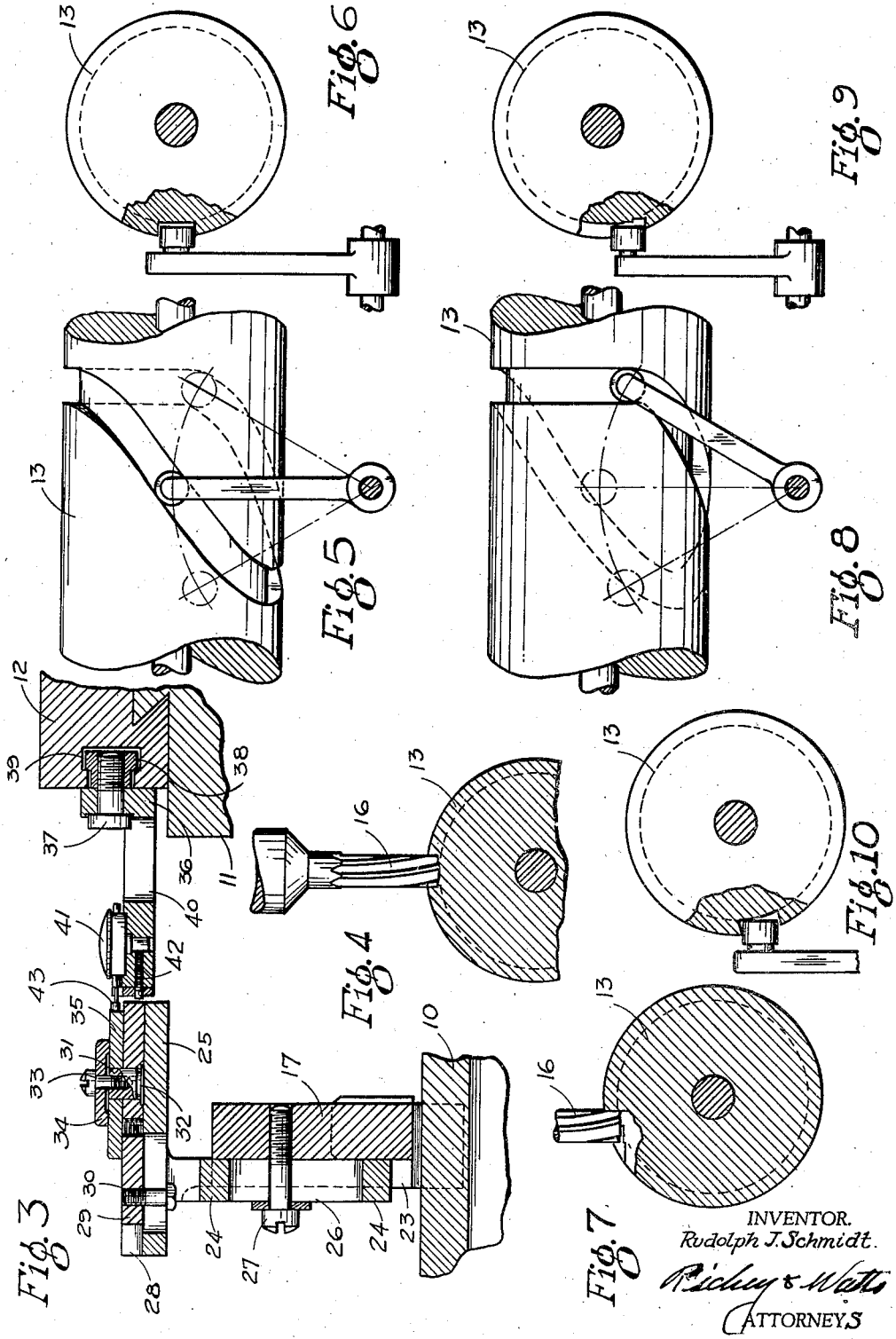

Patented Jan. 23, 1940

2,187,794

UNITED STATES PATENT OFFICE 2,187,794

COMPENSATING ATTACHMENT FOR MILLING MACHINES

Rudolph J. Schmidt, Cleveland Heights, Ohio

Application February 7, 1939, Serial No. 255,140

8 Claims. (Cl. 90—11)

This invention relates broadly to machine tools and more specifically to a milling machine attachment for use in cutting cams and cam grooves in cylindrical bodies.

Although reference is made in the following description to the production of a groove in a cylindrical body, it is to be understood that such disclosure is presented for the purpose of illustration only and that the invention may be employed with equal success in the manufacture of profile cams where the peripheral contour is machined in a like or similar manner.

When the tool maker is presented with the problem of milling a cam groove in a so called barrel cam which is used in conjunction with a pivoted follower arm he is compelled to compute not only the progressive machine table feeds and angular adjustments of the work for the development of the cam lift but also the computations for the complemental offset adjustments necessary to develop a groove in which the side walls are parallel the axis of the follower arm roller when the arm is swung above or below the plane of the horizontal axis of the work.

The tool maker, in calculating the foregoing feeds and adjustments, is required to determine, first, the portion of the periphery of the work within which the arc of swing of the cam follower occurs then the number of subdivisions or cuts required to form a groove which will develop such movement. Next, the tool maker must solve the geometric computations for the table feed and the corresponding angular adjustment of the work for each subdivision or cut and finally the geometric computations for the table cross feed for the cuts taken throughout the arc of swing of the follower arm save those which lie in the horizontal axis of the work. A skilled craftsman usually compiles his calculations in tabular form which, by way of illustration, may appear:

| Table feed (coaxial the work) | Dividing head (angular adj. of work) | Table or saddle cross feed (transaxial the work) |
|---|---|---|
| .2647 | Degrees 2 | .004 |

It is not infrequent in laying out cams having a short dwell and high lift, that as many as one hundred separate computations must be made for each of the settings indicated under the above headings.

The object of the present invention is to provide mechanism for the determination of the table cross feed settings or saddle position without the necessity of making the mathematical computations referred to above and further mechanism which will eliminate the count required in the operation of the micrometric dial for the saddle cross feed adjustment.

Further objects of the invention contemplate the provision of a milling machine attachment which may be readily mounted on numerous machines of various manufacture, an attachment which is adaptable for use in cutting cam grooves for follower arms of variable lengths and an attachment which is durable, rigid and economic of manufacture.

Other objects and advantages more or less ancillary of the foregoing and the manner in which all the various objects are realized will appear in the following description which, considered in connection with the accompanying drawings, sets forth the preferred embodiment of the invention.

Referring to the drawings wherein the preferred embodiment of the invention is illustrated:

Fig. 3 is a vertical sectional view through the attachment, the section being taken on the plane indicated by the line 3—3 in Fig. 1;

Fig. 4 is a diagrammatic view of the milling machine cutter and work piece illustrating the position of the cutter in relation to the vertical axis of the work when the groove is being machined;

Fig. 5 is a diagrammatic side elevational view of a barrel cam and cam follower arm, the extreme movement of the follower arm being shown in dotted lines;

Fig. 6 is an end elevational view of the barrel cam and arm shown in Fig. 5, a fragmentary portion thereof being broken away to show the relation of the follower roller within the cam groove when the arm is swung to the position where the cam follower roller is disposed in the plane of the horizontal axis of the barrel cam;

Fig. 7 is a diagrammatic view of the cutter and work piece showing the position of the cutter or end mill when the milling machine saddle is offset to form the portion of the groove within which the roller is seated for the follower arm when positioned in the plane which passes through the horizontal axis of the barrel cam;

Fig. 8 is a diagrammatic side elevational view of the follower arm 8 and work piece illustrating the position of the arm in relation to the vertical axis of the work when the portion of the groove is machined within which the roller is seated when the follower arm is positoned below the plane of the horizontal axis of the barrel cam;

Fig. 9 is an end elevational view of the barrel cam and follower arm illustrated in Fig. 8, a portion of the barrel cam being broken away to show the relation of the roller to the side walls of the groove when the arm is swung below the plane of the horizontal axis of the barrel cam, i. e., the position of the maximum lift of the cam groove; and Fig. 10 is a diagrammatic view similar to Fig. 9 of an end view of the barrel cam and follower arm illustrating the relation of the cam follower roller to the side walls of the groove when the end mill is positioned coaxial a radius of the cylindrical body of the stock, i. e., the appearance of the groove and relation of the roller to the side walls thereof when the cutter is not offset while forming the portion of the groove within the zone of the maximum lift of the cam groove.

Figure 1:
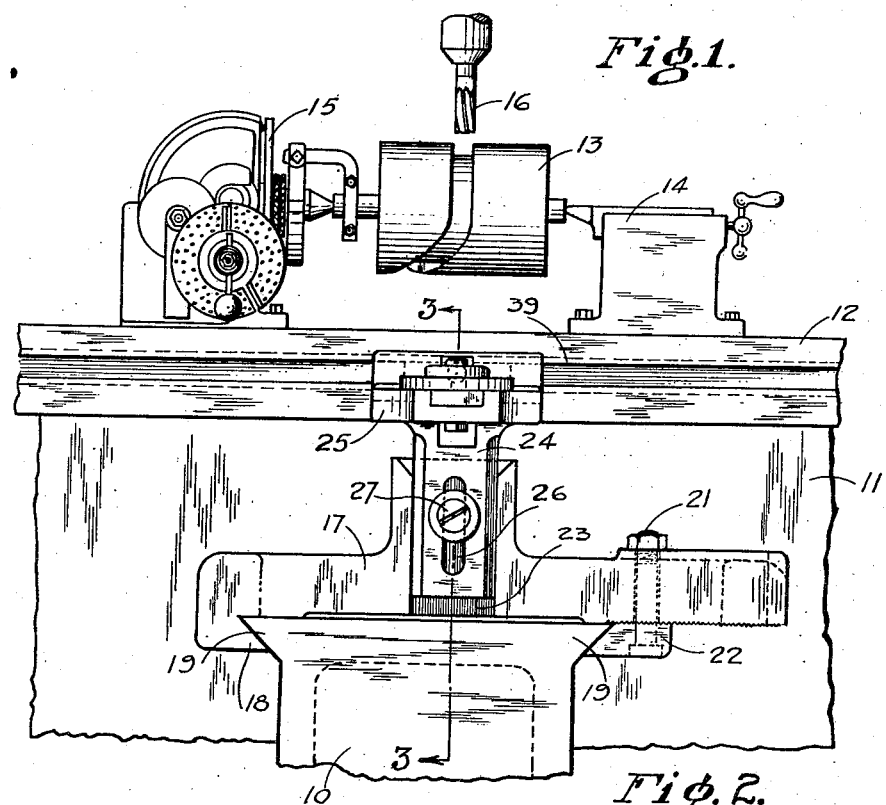
Fig. 1 is a fragmentary portion of a milling machine illustrating the improved cam cutting attachment mounted thereon.
Figure 2:
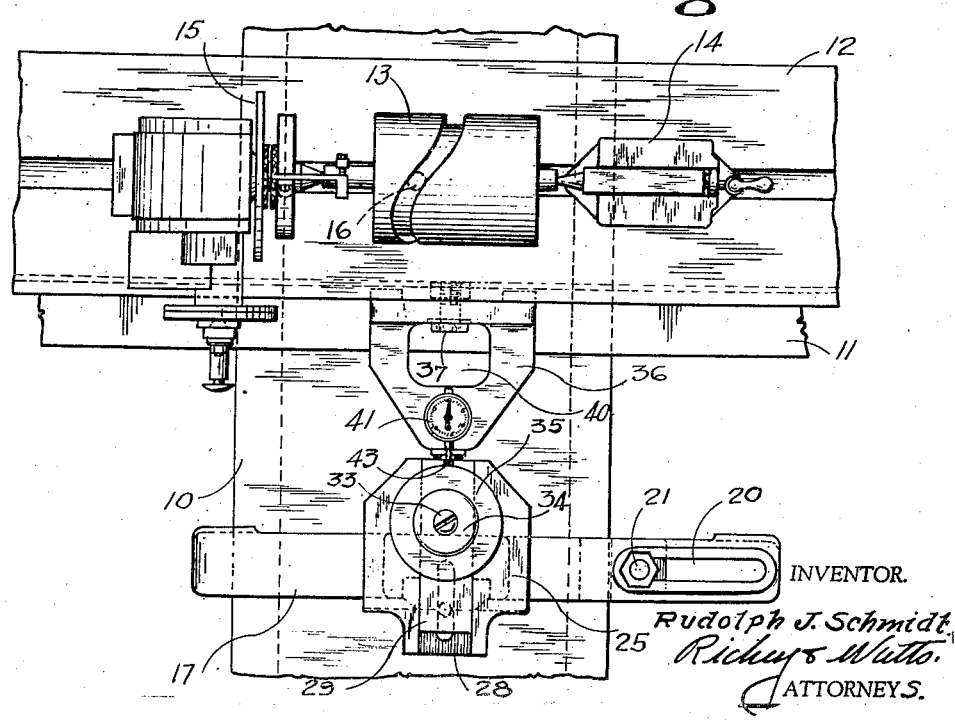
Fig. 2 is a plan view shown somewhat diagrammatically of the portion of the milling machine illustrated in Fig. 1, including the plan view of the cam cutting attachment embodying the present invention.

Referring first to Fig. 1, the milling machine knee 10 is provided with a cross slide or saddle 11 having a longitudinal slide or work table 12 mounted thereon and adapted for movement in a plane normal thereto. The cylindrical stock or work piece 13 is supported between the milling machine dead center 14 and a dividing head 15 mounted on the work table 12. The longitudinal axis of the work 13 is disposed in the vertical plane of the rotary cutter or end mill 16 and normal thereto, being mounted in fixed position and engageable with the work by elevation of the milling machine knee which carries the compound slide or saddle and work table. The attachment for gauging the adjustment of the saddle 11 comprises a bracket 17 formed with a depending flange 18, which is machined to engage the beveled ledge 19 in the upper face of the milling machine knee 10. The opposed side of the bracket 17 is formed with a slot 20 for the reception of a bolt 21 which supports a clamping shoe 22 engageable with the opposed beveled ledge 19 of the knee 10. The lower face of the bracket 17 and upper face of the shoe 22 are serrated to facilitate the ready affixation and rigid securement of the clamping member upon milling machines of various size or of different manufacture.

The bracket 17 is formed with a vertically disposed boss intermediate its ends, having a groove 23 machined therein for the reception of the stem 24 of the cross feed pattern supporting frame 25. The stem 24 is formed with a slot 26 having a cap screw 27 thereon mounted to facilitate the vertical adjustment of the supporting frame 25 to machines of various manufacture. The supporting frame is formed with a horizontally disposed head or platform having a groove 28 machined therein for the reception of a plate 29. The plate is adjustably secured within the groove 28 by a cap screw 30 extended through a slot formed in the head of the supporting frame 25. The plate 29 is provided with a bushing 31 having an enlarged head 32 in the lower face thereof which is seated in a counterbore in the lower face of the plate. The upper portion of the bushing is drilled and tapped for the reception of a cap screw 33, the head of which is engaged with a washer 34 for the securement of a disc 35 upon the upper face of the plate 29. The disc 35 is drilled and reamed to snugly engage the portion of the bushing 31 which extends above the face of the plate 29.

Adjacent the disc 35 and mounted on the work table 12 of the milling machine there is an arm 36 supported by a cap screw 37 and nut 38 in the T-slot 39 customarily provided in the vertical side wall of the table 12. The arm 36 is preferably formed with an aperture 40 in the horizontal web thereof to facilitate adjustment of the cap screw 37 though obviously arms of various other configuration may be employed to accomplish the purpose contemplated herein. The end portion of the arm 36 is drilled and counterbored for the reception of the stem and base of a dial indicator gauge 41, the arm being cross drilled and tapped to receive a set screw 42 for the securement of the dial indicator stem in the arm.

The disc or cross feed pattern 35 is acurately turned or otherwise machined to provide an arcuate portion having a radius equal to the radius of swing of the pivoted follower arm for the particular cam being machined. In cutting a cam of the type contemplated herein the tool maker first determines the arc of swing of the follower arm then selects and mounts upon the frame 25 a disc which is formed to the radius of such arc of swing.

As is apparent in Fig. 3, the longitudinal adjustment provided for the plate 29 is adequate to accommodate discs of appreciable variation in diameter.

In the practice of the invention the tool maker first determines the prerequisite number of angular adjustments required on the dividing head and the degrees thereof necessary to develop the lift of the cam or of the barrel cam groove, then computes the longitudinal table feeds, that is the incremental feed of the table 12 for each angular adjustment.

Next, the saddle and table are adjuste · so that the end mill is positioned in the plane of the vertical axis of the work and at a point as indicated from his calculations where the cam follower arm roller is in a horizontal plane through the axis of the work wherein the groove cutter is coaxial a horizontal radius of the work. The work is then brought into contact with the end mill and the stock spot faced to the depth of the groove. While in this position the disc 35 is arranged with the center thereof disposed in the plane of medial axis of the tool and the dial indicator is then adjusted to register zero when engaged with the periphery of the disc. The tool maker next retracts the end mill from the work, moves the dividing head to the first angular adjustment of the predetermined calculations and moves the table 12 longitudinally or coaxial the work to the feed which corresponds to such angular adjustment. Obviously, as the table 12 is moved longitudinally the dial indicator plunger 43 will traverse the periphery of the disc and come to rest at a point in its circumference beyond and below the initial position of the plunger when the dial indicator was set at zero. The cross feed or saddle 11 is next fed to a position where the indicator will be brought back to the zero reading, whereupon the work may again be brought into contact with the cutter and the milling operation repeated in the manner heretofore described. This cycle of operation is repeated for each of the predetermined computations of the series until a continuous groove is formed in the periphery of the work.

As the saddle is advanced or retracted the work will be moved from the plane of the vertical axis of the cutter to an offset position which, as shown in Figs. 8 and 9, will form a groove having the side walls thereof parallel to the axis of a horizontal plane passing through the axis of the work parallel the cylindrical face of the follower arm roller to be employed therewith. After the groove is machined in the manner described above the side walls of the groove may be honed and the bottom of the groove may be retouched, which will eliminate or reduce the height of the steps formed by the irregular depth of cut of the end mill in the work and resulting from the offset positions of the work in relation to the cutter.

It will be recognized that as the table 12 is adjusted longitudinally the plunger of the dial indicator will be moved towards or away from the plane through the medial axis of the disc 35 and cutter 16, the amount and direction of such movement depending upon the configuration of the cam groove and the amount of travel of the follower arm roller above and below the plane through the horizontal axis of the work. From the foregoing it will be apparent that with the cross feed gauge disclosed herein and irrespective the degree or direction of the offset position of the groove the tool maker will be relieved from the arduous work of solving the triangles for the cross feed movement of the saddle 11 determinative of the position of the work in relation to the cutter.

In order to fully appreciate the advantage of forming the cam groove in offset relation to the horizontal plane through the axis of the work reference may be had to Fig. 10 where a groove is illustrated which was cut with the milling cutter engaged with the work radially throughout the development of the groove. As will be noted in this figure the cylindrical face of one side of the roller is engaged with the corner of the groove while the opposite face of the roller is engaged with the edge of the opposed side wall. Though the direction of thrust upon the roller may vary due to the form of the cam groove the bearing on the corners of the groove is always present in a cam groove of this type. Obviously, such construction affords undue wear upon the roller and side walls of the groove. Moreover, with such construction the roller may abrade the bottom of the groove or spring the roller pin beyond its elastic limit.

In order to minimize the wear in the radial type of grove frustro conical rollers have been employed with grooves formed with inclined side walls. Such construction is resorted to in mechanisms where accuracy in the orientation of parts is required. Such construction is, however, unsatisfactory since it is impossible to form a roller with sufficient taper to avoid impingement of the roller with the side walls of the groove and at the same time preserve such proportions in the transverse section of the roller pin to withstand the strains imposed thereon.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In a milling machine having a knee and a movable saddle and work table mounted thereon, an attachment for gauging the feed of the saddle in milling a cam groove used with a pivoted follower arm, comprising a bracket mounted upon the knee of the milling machine, a circular disc mounted on said bracket, the radius of said disc being equal to the radius of swing of the cam follower arm used with the cam being machined, an arm mounted on the work table and a dial indicator mounted on said arm and engaged with the periphery of said disc.

2. In a milling machine having a knee and a movable saddle and work table mounted thereon, an attachment for gauging the feed of the saddle in milling a cam groove used with a pivoted follower arm, comprising a plate formed with an arcuate portion having a radius equal to the radius of swing of the cam follower arm used with the cam being machined, means for supporting said plate upon the knee of the milling machine, a dial indicator engaged with the arcuate portion of said plate and means for supporting said indicator on the work table.

3. In a milling machine having a knee and a movable saddle and work table mounted thereon, an attachment for gauging the feed of the saddle in milling a cam groove used with a pivoted follower arm, comprising an adjustable bracket mounted on the milling machine knee, a vertically adjustable post on said bracket, a horizontally adjustable plate mounted on said post, a circular disc mounted on said plate, the radius thereof being equal to the radius of the swing of the cam follower arm used with the cam being machined, an arm mounted on the milling machine work table, and a dial indicator mounted thereon and engaged with the peripheral edge of said disc.

4. A device for gauging the incremental offset positions of a cutter relative to the work piece in cutting a groove in a barrel cam of the type used in conjunction with a pivoted follower arm, comprising a bracket mounted on a stationary portion of a machine, a disc mounted thereon having an arcuate portion therein formed of a radius equal the radius of swing of the follower arm, a dial indicator mounted on a portion of the machine which is movable towards, away from and across the axis of said disc, said indicator being engaged with the arcuate portion of said disc.

5. In a machine tool having a compound table slide, a device for gauging the successive feed adjustments of the cross slide in relation to the successive feed adjustments of the longitudinal slide when cutting a work piece to a curved line cross feed pattern, said gauge comprising a pattern plate formed with a curved surface thereon, mounted on the machine tool in a stationary position in relation to the compound slides, a dial indicator, a plunger thereon engaged with said curved surface, said indicator being mounted on said longitudinal slide, said plunger being disposed to traverse said curved surface upon translation of said longitudinal slide, whereby the cross slide feed adjustment will be indicated without mathematical computation for each successive feed adjustment of the longitudinal slide.

6. In a milling machine having an adjustable knee and a movable saddle and work table mounted thereon, an attachment for indicating the feed of the saddle movement in milling a cam which is used with a pivoted follower arm, comprising a plate formed with an arcuate portion therein of a radius equal to the radius of swing of the cam follower arm, means for supporting said plate on the knee of the milling machine, a dial indicator engaged with the arcuate portion of said plate and means for supporting said indicator on the work table.

7. The method of milling a groove in a barrel cam which comprises computing a series of milling machine table feeds for the portion of the groove which causes movement of the cam follower arm, each computation in the series constituting the dimension of movement of the work piece relative to the cutter, computing the angles of adjustment of the work piece for each of said table feeds, moving the saddle of the milling machine contemporaneous with each table feed adjustment, the movement of the saddle for each table feed adjustment being determined by gauging the distance corresponding to the length of a perpendicular from a line parallel to the milling machine table and tangent to an arc of swing of the follower arm to the point of intersection of said perpendicular with said arc.

8. The method of milling a groove in a barrel cam which comprises computing a series of milling machine table feeds for the portion of the groove which causes movement of the cam follower arm, each computation in the series constituting the dimension of movement of the work piece relative to the cutter, computing the angles of adjustment of the work piece for each of said table feeds, moving the saddle of the milling machine contemporaneous with each table feed adjustment, the movement of the saddle being determined by gauging on an arc of the radius of swing of the follower arm the variations resulting from successive table adjustments.

RUDOLPH J. SCHMIDT.